United States Patent
Djelassi

(10) Patent No.: US 10,465,613 B2
(45) Date of Patent: Nov. 5, 2019

(54) METHOD AND A DEVICE FOR GENERATING A COMMAND FOR THE FLOW RATE OF FUEL THAT IS TO BE INJECTED INTO A COMBUSTION CHAMBER OF A TURBINE ENGINE

(71) Applicant: SNECMA, Paris (FR)

(72) Inventor: Cedrik Djelassi, Marolles-en-Hurepoix (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 875 days.

(21) Appl. No.: 14/786,477

(22) PCT Filed: Apr. 22, 2014

(86) PCT No.: PCT/FR2014/050978
§ 371 (c)(1),
(2) Date: Oct. 22, 2015

(87) PCT Pub. No.: WO2014/174208
PCT Pub. Date: Oct. 30, 2014

(65) Prior Publication Data
US 2016/0069276 A1 Mar. 10, 2016

(30) Foreign Application Priority Data
Apr. 23, 2013 (FR) ..................................... 13 53700

(51) Int. Cl.
*F02C 9/28* (2006.01)
*F02C 7/26* (2006.01)
(Continued)

(52) U.S. Cl.
CPC .................. *F02C 9/28* (2013.01); *F02C 7/26* (2013.01); *F02C 9/26* (2013.01); *F02D 41/14* (2013.01);
(Continued)

(58) Field of Classification Search
CPC ...... F02C 9/26; F02C 9/28; F02C 9/00; F02C 9/32; F02C 9/44; F02C 9/46; F02C 7/26;
(Continued)

(56) References Cited

U.S. PATENT DOCUMENTS 3,520,133 A * 7/1970 Loft .......................... F02C 7/26
60/39.281
3,638,422 A * 2/1972 Loft .......................... F02C 9/54
416/30
(Continued)

FOREIGN PATENT DOCUMENTS

EP 1 555 438 A2 7/2005
EP 2 476 910 A2 7/2012
(Continued)

OTHER PUBLICATIONS

ISA, "Automation Basics: P, I, and D together, separately control the process", Jun. 2009, InTech Magazine, retrieved from the ISA website on Apr. 10, 2019, https://www.isa.org/standards-and-publications/isa-publications/intech-magazine/2009/june/automation-basics-pi-an (Year: 2009).*

(Continued)

*Primary Examiner* — Gerald L Sung
*Assistant Examiner* — Stephanie Cheng
(74) *Attorney, Agent, or Firm* — Bookoff McAndrews, PLLC

(57) ABSTRACT

During a stage (E0) of starting the turbine engine, the method of the invention comprises:
an open-loop generating step (E10) of generating a fuel flow rate command (WF_OL) from at least one pre-established relationship; and
a closed-loop monitoring step (E20-E30) of monitoring at least one operating parameter of the turbine engine selected from:
a rate of acceleration (dN2/dt) of a compressor of the turbine engine; and
a temperature (EGT) at the outlet from a turbine of the turbine engine;
this monitoring step comprising maintaining (E30) the operating parameter in a determined range of values by (Continued)

using at least one corrector network (R1, R2, R3) associated with the parameter and suitable for delivering a signal for correcting the open-loop generated fuel flow rate command so as to maintain the operating parameter in the determined range of values.

18 Claims, 3 Drawing Sheets

(51) Int. Cl.
*F02D 41/14* (2006.01)
*F02C 9/26* (2006.01)

(52) U.S. Cl.
CPC ............... *F02D 2041/1409* (2013.01); *F02D 2041/1422* (2013.01); *F05D 2260/85* (2013.01); *F05D 2270/04* (2013.01); *F05D 2270/10* (2013.01); *F05D 2270/101* (2013.01); *F05D 2270/112* (2013.01); *F05D 2270/3032* (2013.01); *F05D 2270/705* (2013.01)

(58) Field of Classification Search
CPC .......... F02C 7/264; F02C 9/263; F02C 9/266; F02C 9/285; F02C 9/30; F02C 9/34; F02C 9/36; F02C 9/38; F02C 9/40; F02C 9/48; F05D 2270/04; F05D 2270/303; F05D 2270/101; F05D 2260/85; F02D 41/14
USPC .......................................................... 60/776
See application file for complete search history.

(56) References Cited

U.S. PATENT DOCUMENTS

| | | | | |
|---|---|---|---|---|
| 3,656,301 A * | 4/1972 | Katz | ........................ | F02K 1/17 60/39.281 |
| 3,794,972 A * | 2/1974 | Van Ostrom | ....... | B60T 8/17613 303/138 |
| 3,937,588 A | 2/1976 | Kisslan | | |
| 4,117,668 A * | 10/1978 | Elsaesser | .................. | F02C 7/00 60/773 |
| 4,341,071 A * | 7/1982 | Abo | ......................... | F02C 9/28 60/39.281 |
| 4,507,915 A * | 4/1985 | Evans | ....................... | F02C 9/28 60/39.281 |
| 4,517,797 A * | 5/1985 | Adachi | ..................... | F02C 9/28 60/39.281 |
| 4,625,510 A * | 12/1986 | Evans | ....................... | F02C 9/28 60/39.281 |
| 5,437,539 A * | 8/1995 | Gysling | .................... | F04D 3/00 415/146 |
| 5,469,700 A * | 11/1995 | Corbett | ..................... | F02C 9/28 60/39.281 |
| 6,357,219 B1 * | 3/2002 | Dudd, Jr. | .................. | F02C 7/26 60/39.281 |
| 6,609,378 B2 * | 8/2003 | Scott | ......................... | F02C 9/40 60/39.281 |
| 6,742,340 B2 * | 6/2004 | Nearhoof, Sr. | .......... | F02C 9/28 60/39.281 |
| 7,926,512 B2 * | 4/2011 | Spickard | ................ | F02C 7/232 137/625.64 |

FOREIGN PATENT DOCUMENTS

| | | |
|---|---|---|
| FR | 2 664 651 A1 | 1/1992 |
| FR | 2 972 233 A1 | 9/2012 |

OTHER PUBLICATIONS

Hewitson, Digital Vs Analog control, Feb. 2010, GEO ISC Meeting, Hannover, Power Point slides 1-65, retrieved on Apr. 15, 2019 from https://www.aei.mpg.de/~hewitson/presentations/presentations_2010/files/digi_analog_control.pdf (Year: 2010).*

English Translation of Search Report dated Jul. 10, 2014, in corresponding International PCT Application No. PCT/FR2014/050978, filed on Apr. 22, 2014 (3 pages).

* cited by examiner

METHOD AND A DEVICE FOR GENERATING A COMMAND FOR THE FLOW RATE OF FUEL THAT IS TO BE INJECTED INTO A COMBUSTION CHAMBER OF A TURBINE ENGINE

CROSS-REFERENCE TO RELATED APPLICATIONS

This application is the U.S. national phase entry under 35 U.S.C. § 371 of International PCT Application No. PCT/FR2014/050978, filed on Apr. 22, 2014, which claims priority to French Patent Application No. FR 1353700 filed on Apr. 23, 2013, the entireties of each of which are incorporated by reference herein.

BACKGROUND OF THE INVENTION

The present invention relates to the general field of turbine engines, and it applies in preferred manner to the field of aviation.

The invention relates more particularly to regulating the flow rate of fuel for a turbine engine of an aircraft, such as a turbojet, for example, during a stage of starting the aircraft.

In known manner, the flow rate of fuel for a turbojet is regulated by generating appropriate fuel flow rate commands for the purpose of ensuring that the mass flow rate of fuel injected into the combustion chamber of the turbojet does not exceed a certain (lower or upper) limit beyond which a malfunction of the turbojet may be encountered, such as for example shutdown or surging of a compressor of the turbojet.

Such regulation is conventionally performed in an open-loop using fuel flow rate commands generated on the basis of a relationship, or more precisely on the basis of a network of pre-established relationships, giving the flow rate of fuel to be injected into the combustion chamber for various different reduced (normalized) speed values of a compressor of the turbojet (e.g. a high-pressure compressor for a two-spool turbojet).

In general, two distinct groups of networks of pre-established relationships are taken into consideration:
  a first group of relationship networks for ensuring ignition in the combustion chamber, and providing a fuel flow rate command written WMCmd as a function of at least the reduced speed of the compressor which is written XNr, in other words:

$WFCmd = f(XNr)$; and a second group of relationship networks, also known as C/P limits (referring to the ratio of the flow rate C of fuel injected into the combustion chamber divided by the static pressure P measured at the outlet from the combustion chamber), specifying the fuel flow rate for managing the turbojet spin-up stage until it reaches idling speed. In known manner, one such limit may be written in particular in the following form:

$$\frac{WF}{PS\sqrt{T/288.15}} = f(XNr, PT)$$

where WF is the fuel flow rate, PS is the static pressure in the combustion chamber, T is the total temperature at the inlet to the high-pressure compressor, XNr is the reduced speed of the high-pressure spool, and PT is the total pressure at the inlet to the fan.

These various relationship networks are drawn up so as to take account of the specific features of the turbojet and also its sensitivity to various parameters, such as, for example: outside temperature, flight domain, etc.

Presently-designed turbojets present ever increasing performance, and their components (compressor, turbine, etc.) are optimized for operating at high speed, to the detriment of low speeds, and in particular during the starting stage.

This leads to modern turbojets being very sensitive to external conditions (e.g. thermal state of the turbojet, outside temperature, accuracy with which fuel is metered, type of fuel injected, outside temperature, aging of the jet, etc.), and it also leads to wide dispersion in behavior between turbojets.

The operability limits of turbojets that are taken into account during open-loop regulation are thus subject to a large degree of variability from one turbojet to another, which is difficult to predict.

Furthermore, the very great sensitivity of such turbojets to numerous parameters makes it laborious, if not impossible, to adjust the above-mentioned command relationships.

It should be observed that for a turbojet having a high-pressure compressor with a compression ratio that is high relative to the number of stages in the compressor, this very great sensitivity also leads to the existence of a relatively narrow corridor between the surging limit and the stagnation limit.

There therefore exists a need for a mechanism for regulating the flow rate of fuel for a turbine engine that is effective and appropriate for the starting stage, which mechanism takes account of the above-mentioned constraints that are imposed by the turbine engines being designed nowadays.

OBJECT AND SUMMARY OF THE INVENTION

The present invention satisfies this need in particular by proposing a method of generating a command of a fuel flow rate to be injected into a combustion chamber of a turbine engine for propelling an aircraft, the method being for use during a stage of starting the turbine engine, and comprising:
  an open-loop generating step of generating a fuel flow rate command from at least one pre-established relationship; and
  a closed-loop monitoring step of monitoring at least one operating parameter of the turbine engine selected from:
    a rate of acceleration of a compressor of the turbine engine; and
    a temperature at the outlet from a turbine of the turbine engine;
  this monitoring step comprising maintaining the operating parameter in a determined range of values by using at least one corrector network associated with the parameter and suitable for delivering a signal for correcting the open-loop generated fuel flow rate command so as to maintain the operating parameter in the determined range of values.

Correspondingly, the invention also provides a device for generating a command of a fuel flow rate to be injected into a combustion chamber of a turbine engine for propelling an aircraft, the device comprising means that are activated during a stage of starting the turbine engine and that comprise:

a generator module for open-loop generation of a command of the fuel flow rate from at least one pre-established relationship; and a monitoring module for closed-loop monitoring of at least one operating parameter of the turbine engine selected from:

a rate of acceleration of a compressor of the turbine engine; and a temperature at the outlet from a turbine of the turbine engine;

the monitoring module being suitable for maintaining the operating parameter in a determined range of values, and comprising at least one corrector network associated with that parameter and suitable for delivering a correction signal for correcting the open-loop generated fuel flow rate command so as to enable the operating parameter to be maintained in the determined range of values, and correction means that are activated, where appropriate, for correcting the fuel flow rate command generated by the generator module by using the correction signal delivered by the corrector network.

The invention thus proposes introducing closed-loop regulation of the fuel flow rate that is to be injected into the combustion chamber of the turbine engine, thereby enabling certain suitably selected operating parameters of the turbine engine to be contained within a determined range of values so as to keep the turbine engine within conditions of operability.

Such operating parameters are typically the rate of acceleration of a compressor of the turbine engine and the temperature at the outlet from the turbine of the turbine engine.

The invention thus defines a control corridor (or in equivalent manner a range of values that are authorized) around the regulation relationship that is conventionally used in an open-loop: so long as the operating parameters of the turbine engine continue to have current values that are contained within the corridor, then the fuel flow rate is regulated by commands generated on the basis of conventional control relationships for open-loop regulation of the fuel flow rate. In contrast, once the current value of any one of the operating parameters leaves or is likely to leave the corridor, a control-loop is implemented in accordance with the invention in order to correct (i.e. adjust) the fuel flow rate as established from such conventional open-loop control relationships, so that, where necessary, these values for the operating parameters are returned to and maintain within the control corridor.

In accordance with the invention, the closed-loop regulation of the fuel flow rate that is used is thus not a full authority regulation-loop: it comes into operation only when certain operating parameters of the turbine engine cross or are about to cross pre-established setpoint values that are deduced from the operability limits of the turbine engine.

For this purpose, the closed-loop regulation proposed by the invention relies advantageously on corrector networks associated with the operating parameter(s) that are being monitored, and more precisely on correction signals that those corrector networks deliver, when necessary, for the purpose of enabling operating parameters to be maintained within the intended control corridor. The correction signals are applied to the open-loop generated command so that the command as corrected in this way serves to maintain the operating values within the range of values defining the control corridor.

Consequently, the invention is particularly original in that for the purpose of regulating the flow rate of fuel injected into the combustion chamber of the turbine engine it proposes relying on a main control that is open-loop generated, and that is adjusted, if necessary, by means of a closed-loop relying on corrector networks suitable for ensuring that the rate of acceleration of the compressor and/or the temperature at the outlet from the turbine are contained within a range of predetermined values so as to guarantee operability of the turbine engine.

In other words, the invention is relatively easy to implement. It does not require knowledge of how the operating parameters vary as a function of the injected fuel flow rate, but only requires control templates to be defined for these operating parameters, i.e. ranges of values within which these operating parameters ought to lie, which is particularly simple to undertake.

Consequently, the invention can be incorporated very easily in existing control architectures that are based on open-loop regulation of the fuel flow rate.

The invention makes it possible to benefit from advantages that result from closed-loop regulation of the fuel flow rate (i.e. effectiveness, better accuracy), while guaranteeing simplicity and ease of implementation.

These operating parameters that are taken into consideration for closed-loop regulation as proposed by the invention comprise in particular a rate of acceleration of a compressor of the turbine engine (e.g. the high-pressure compressor in a two-spool turbine engine), and a temperature at the outlet from the turbine of the turbine engine, also known as the exhaust gas temperature (EGT).

In known manner, such operating parameters are already measured by using sensors of the aircraft or of the turbine engine, or in a variant they are evaluated on the basis of measurements coming from such sensors, and they participate in the monitoring and control of the turbine engine as performed by the full authority digital engine control (FADEC) system of the aircraft. There is therefore no need to include new sensors on board the aircraft or the turbine engine in order to implement the invention.

Monitoring the rate of acceleration makes it possible advantageously to detect stagnation or surging of the turbine engine.

Thus, during the monitoring step, the rate of acceleration of the compressor of the turbine engine is preferably maintained between a minimum acceleration setpoint value (in order to avoid a risk of stagnation) and a maximum acceleration setpoint value (in order to avoid a risk of surging) by using two distinct corrector networks.

Monitoring the temperature at the outlet from the turbine serves to detect behavior of the turbine engine that runs the risk of requiring starting to be interrupted.

In order to avoid such interruption, during the monitoring step, the temperature at the outlet from the turbine of the turbine engine is preferably maintained below a maximum temperature setpoint value.

Naturally, the invention is not limited to the above-mentioned operating parameters, namely the rate of acceleration and the temperature at the outlet from the turbine, and it is also possible to envisage monitoring other operating parameters in addition to the above-mentioned parameters that have an impact on the behavior of the turbine engine on starting, such as for example the pressure in the combustion chamber.

In a particular implementation, both the rate of acceleration of the compressor and the temperature at the outlet from the turbine are monitored, and the monitoring step includes selecting one of the signals from among the correction signals generated by the corrector networks associated with the rate of acceleration of the compressor and with the temperature at the outlet from the turbine, the selected signal being used for correcting the open-loop generated fuel flow rate command.

Correspondingly, in a particular embodiment, the monitoring module comprises a plurality of corrector networks and the means for selecting one of the correction signals from among the correction signals delivered by the corrector networks, the selected signal being delivered to the correction means for correcting the fuel flow rate command as generated in an open-loop by the generator module.

It should be observed that, at any given instant, the corrector networks do not necessarily all provide a respective correction signal (i.e. the corrector networks do not need to be activated continuously). This depends in particular on the current value of the operating parameter being monitored by each corrector network, which value may lie in a range of values that are acceptable (i.e. "valid" or "authorized") for that parameter and that enable the turbine engine to operate, such that properly speaking there is no need for any correction to the open-loop generated fuel flow rate command.

The selection that is performed during the monitoring step, where appropriate, serves to organize the correction signals delivered by the various corrector networks in hierarchical manner, in particular so as to limit any divergencies that might appear between the correction signals.

By way of example, such selection may be performed by a succession of components suitable for selecting the minimum value or the maximum value from among the signals present at their inputs, and suitably arranged between the outputs of the corrector networks.

By way of illustration, in certain situations, it can happen that the temperature at the outlet from the turbine and the rate of acceleration of the compressor both depart from their respective control corridors. In particular, it can happen that the rate of acceleration of the compressor approaches a minimum setpoint value representative of abnormal stagnation of the turbine engine, while the temperature at the outlet from the turbine begins to exceed a maximum setpoint value.

In such a situation, it is necessary to select the most appropriate correction signal from among the correction signals delivered by the corrector networks.

For this purpose, it is preferable to give precedence to high setpoints, i.e. the selected correction signal is the correction signal that is generated by the corrector network that is associated with the temperature at the outlet from the turbine, and that delivers a correction signal enabling the value of the temperature at the outlet from the turbine to be kept below a maximum setpoint value.

This ensures that the turbine engine is not damaged irremediably as a result of overheating, which can be fatal.

In a particular implementation, each corrector network is of the proportional integral type (e.g. class 1 proportional integral PI, or proportional double integral PI-I), and is suitable for delivering a correction signal for correcting the fuel flow rate command, which correction signal is evaluated from a difference between a current value of the operating parameter with which it is associated and a determined setpoint value.

This implementation is relatively easy to perform by adjusting parameters of each corrector network (e.g. gain, activation of the network, etc.). Thus, the gain of each network may depend in particular on a static pressure in the combustion chamber and on a total pressure at the inlet of a fan of the turbine engine.

In a preferred implementation, the regulator means comprise a corrector network for each monitored parameter and for each setpoint value established for that parameter.

Thus, by way of illustration, if the operating parameters taken into consideration are the rate of acceleration of a compressor of the turbine engine and the temperature EGT, and if the monitoring module of the device is configured to maintain the rate of acceleration of the compressor between a minimum acceleration setpoint value and a maximum acceleration setpoint value, and to keep the temperature EGT below a maximum temperature setpoint value, then the generator device of the invention may have three corrector networks.

When the regulator device has a plurality of corrector networks, the corrector networks may advantageously share a common integrator, preferably a saturated integrator.

By way of example, this saturation of the common integrator can be performed as a function of the open-loop generated fuel flow rate command.

This makes it possible to reduce the complexity and the cost associated with implementing the invention.

Saturation of the common integrator also makes it possible to limit the correction signals delivered by the corrector networks.

The common integrator may also be used by the open-loop so as to limit discontinuities that might appear between fuel flow rate commands.

Correspondingly, in a particular implementation, the method of generation further includes a saturating step for saturating the open-loop generated command or the open-loop generated command as corrected using the correction signal, which saturation depends on the nominal relationship.

By way of example, this saturation is defined from a determined percentage of the nominal relationship.

This saturation step serves to limit the fuel flow rate commands used for regulating the turbine engine on starting.

This saturation step may be envisaged in particular when it is desired to limit the flow rate of fuel injected into the combustion chamber, e.g. in order to remain within fuel injection limits specified by the metering device of the turbine engine.

This saturation step also makes it possible to guarantee that the commands used for regulating the turbine engine in fuel flow rate are not divergent or aberrant, in particular in the event of a failure of the turbine engine.

Regardless of whether the open-loop generated command is subjected to an adjustment step, this saturation step may force the open-loop generated command to take one or the other of a first limit value and a second limit value corresponding respectively to a minimum percentage and to a maximum percentage of the open-loop generated command that has not been subjected to said adjustment step, whenever the current value of the open-loop generated command is respectively less than the first limit value or greater than the second limit value.

In a particular implementation, the various steps of the generator method are determined by computer program instructions.

Consequently, the invention also provides a computer program on a data medium, the program being suitable for being implemented in a generator device or more generally in a computer, the program including instructions adapted for performing steps of a method of generation as defined above.

The program may use any programming language, and be in the form of source code, object code, or code intermediate between source code and object code, such as in a partially compiled form, or in any other desirable form.

The invention also provides a computer readable data medium that includes instructions of a computer program as mentioned above.

The data medium may be any entity or device capable of storing the program. For example, the medium may comprise storage means such as a read only memory (ROM), e.g. a compact disk (CD) ROM or a microelectronic circuit ROM, or indeed magnetic recording means, such as a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

The invention also provides a turbine engine including a generator device of the invention.

The generator device is preferably incorporated in the full authority control system of the aircraft.

The turbine engine of the invention benefits from the same advantages as those mentioned above for the method of generation and the generator device.

In other implementations or embodiments, it is also possible to envisage that the method of generation, the generator device, and the turbine engine of the invention present in combination all or some of the above-mentioned characteristics.

BRIEF DESCRIPTION OF THE DRAWINGS

Other characteristics and advantages of the present invention appear from the following description made with reference to the accompanying drawings, which show an implementation having no limiting character. In the figures.

DETAILED DESCRIPTION OF THE INVENTION

Figure 1:
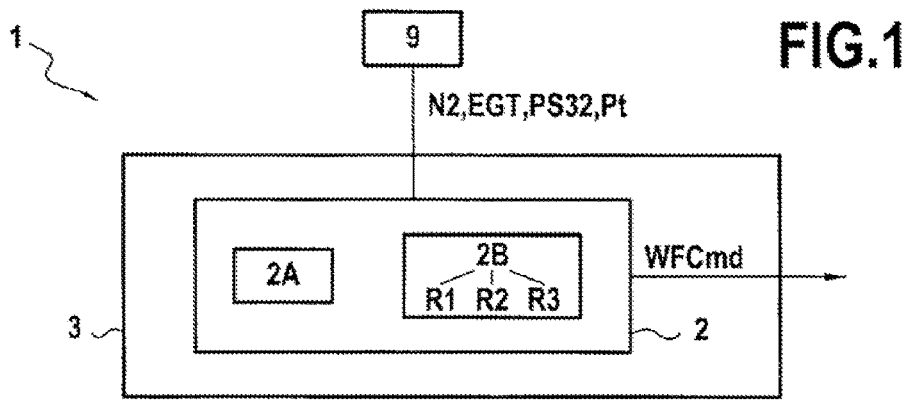
FIG. 1 shows a turbine engine and a generator device in accordance with the invention, in a particular embodiment.

FIG. 1 is a diagram showing a turbine engine 1 in accordance with the invention in its environment, in a particular embodiment.

In this embodiment, the turbine engine 1 is a bypass two-spool turbojet for propelling an airplane. Nevertheless, the invention applies to other turbine engines such as, for example: a single-spool turbojet or a turboprop, and also to other types of aircraft.

In known manner, the turbojet 1 has a fuel metering device, also called a fuel meter, that is suitable for adjusting the quantity of fuel coming from the fuel circuit of the airplane and delivered by the fuel injector system of the combustion chamber of the turbojet. The fuel injector, the fuel circuit, and the fuel injector system of the combustion chamber of the turbojet 1 are omitted in FIG. 1 for simplification purposes.

In this example, the fuel meter of the turbojet 1 has a fuel metering valve (FMV) of position that varies as a function of the fuel flow rate to be injected into the combustion chamber. The fuel flow rate to be injected into the combustion chamber is transmitted to the fuel meter in the form of a command WFCmd, via a servo-control-loop.

This fuel flow rate command WFCmd is established by a generator device 2 in accordance with the invention, which device is incorporated in the presently-described embodiment in the FADEC system 3 of the airplane.

In order to establish this command, the regulator device 2 relies on two main functional entities:

a generator module 2A suitable for operating in an open-loop to generate a fuel flow rate command WF_OL on the basis of a relationship or a network of regulation relationships pre-established as a function of the current reduced speed of rotation of the turbojet 1; and a monitor module 2B suitable for operating in a closed-loop to monitor operating parameters of the turbojet 1, and for acting via said closed-loop to maintain these operating parameters within a predetermined range of values by means of various corrector networks referenced R1, R2, and R3. These corrector networks are suitable, where appropriate, for delivering correction signals that enable the monitor module 2B to modulate (i.e. adjust or correct) the command WF_OL as generated by the module 2A, so that the current values of the operating parameters of the turbojet that result from the metering device applying the command as adjusted remains contained within the above-specified range of values.

In the presently-described example, provision is made for the module 2B to use the corrector networks R1, R2, and R3 to monitor two operating parameters of the turbojet 1, namely:

the rate of acceleration, written (dN2/dt), of the high-pressure compressor of the turbojet 1, which rate is obtained by taking the time derivative of the speed of rotation N2 of the high-pressure compressor; and the exhaust gas temperature, written EGT, at the outlet from the turbine of the turbojet 1.

Nevertheless, no limit is put on the number of operating parameters of the turbojet that may be monitored in accordance with the invention, and in other implementations, it is possible to envisage monitoring only the rate of acceleration of a compressor of the turbojet 1, or in a variant monitoring other operating parameters in addition to the rate of acceleration of the compressor of the turbojet and/or the gas temperature at the outlet from the turbojet turbine.

In the presently-described implementation, the above-described functional modules 2A and 2B are software modules implemented by the generator device 2 in the context of the logic applied by the FADEC 3 to regulating the turbojet 1.

Figure 2:
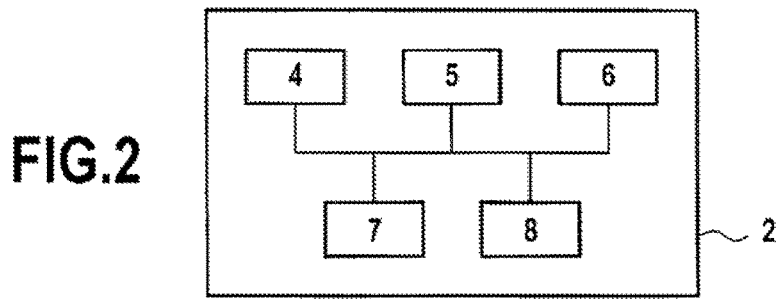
FIG. 2 is a diagram representing the hardware architecture of the generator device of FIG. 1.

For this purpose, the generator device 2 possesses the hardware architecture of a computer, as shown diagrammatically in FIG. 2. In particular, it comprises a processor 4, a random access memory (RAM) 5, a ROM 6, a non-volatile flash memory 7, and communication means 8, possibly shared with other regulator units of the FADEC 3.

The communication means 8 comprise means for communicating with various sensors 9 of the airplane, and suitable for providing the generator device 2 with measurements of the current values for the speed of rotation N2 of the high-pressure compressor of the turbojet 1, of the temperature EGT of the gas at the outlet from the turbine of the turbojet 1, and also of the static pressure PS32 in the combustion chamber and the total pressure Pt at the inlet to the fan of the turbojet 1.

By way of example, the sensors 9 may comprise a speed sensor, a temperature sensor, and pressure sensors positioned so as to measure the parameters N2, EGT, PS32, and Pt, in conventional manner.

The measurements delivered by these sensors 9 enable the generator device 2 specifically to estimate a current value for the rate of acceleration (dN2/dt), in conventional manner, by differentiating the speed of rotation N2, and to monitor the parameters (dN2/dt) and EGT in accordance with the invention.

The ROM 6 of the generator device 2 constitutes a data medium in accordance with the invention that is readable by the processor 4 and that stores a computer program in accordance with the invention, including instructions for executing steps of a method of generation in accordance with the invention and as described below with reference to FIG. 3.

Figure 3:
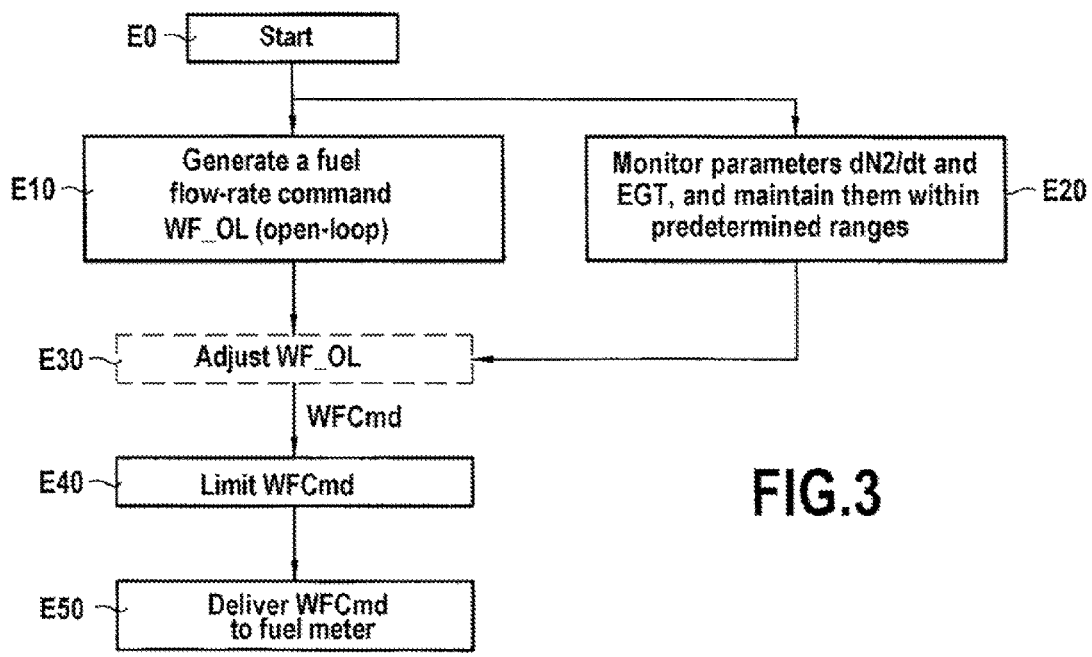
FIG. 3 is in the form of a flow chart showing the main steps of the method of generation implemented by the generator device of FIG. 1.

FIG. 3 is a flow chart showing the main steps of the method of generation of the invention in a particular implementation in which it is performed by the generator device 2 of FIG. 1 for the purpose of regulating the fuel flow rate of the turbojet 1.

Such a method applies in preferred manner during a stage of starting the turbojet 1.

It is assumed in this example that the turbojet 1 is in a starting stage (step E0). This starting stage results from a specific command being applied to the turbojet 1, and it can easily be detected in conventional manner.

It should be observed that the invention applies to any type of starting of the turbojet 1: it may be starting the turbojet 1 on the ground after it has been shut down for a long period, or equally well restarting in flight, or to reigniting the turbojet 1 after a flame-out of short duration.

In accordance with the invention, the generator device 2 of the FADEC 3 acts during this starting stage of the turbojet 1 to perform "main" regulation of the fuel flow rate to be injected into the combustion chamber of the turbojet 1 in an open-loop and using the module 2A (step E10).

More specifically, during this step E10, the module 2A generates a fuel flow rate command WF_OL on the basis of a relationship or of a network of pre-established relationships LN. This network of relationships establishes a command (i.e. a value) for the fuel flow rate to be sent to the fuel meter of the turbojet 1, which command is established as a function of the reduced speed of rotation of the turbojet 1.

Such a network of relationships is itself known and has already been described. It applies in particular both to a first relationship for ensuring ignition of the combustion chamber, and delivering a fuel flow rate command as a function of the reduced speed of the compressor, and also to a C/P second limit for managing the spin-up stage of the turbojet up to idling speed. The way in which such command relationships are prepared and taken into account is known to the person skilled in the art and is not described further herein.

In the prior art, the command WF_OL is to be delivered to the fuel meter of the turbojet 1 directly.

In contrast, in accordance with the invention, in parallel with this open-loop regulation implemented using the command WF_OL, the generator device 2 uses the module 2B to monitor the current values of the rate of acceleration (dN2/dt) of the high-pressure compressor of the turbojet 1 and of the temperature EGT at the outlet from the turbine (step E20).

These current values are the values of the rate of acceleration dN2/dt and of the temperature EGT that results from the fuel flow rate regulation performed by the FADEC on the basis of the command WF_OL generated by the module 2A without correction, at least while the method is starting.

These current values are obtained by the module 2B from measurements taken by the speed and temperature sensors 9 of the airplane, e.g. periodically, giving current values for the speed of rotation N2 of the high-pressure spool and for the temperature EGT at the outlet from the turbine. Thereafter, the module 2B differentiates the current measurement of the speed N2 relative to time in order to estimate a current value of the rate of acceleration dN2/dt.

In accordance with the invention, these current values for the rate of acceleration dN2/dt and for the temperature EGT are monitored by the module 2B, i.e. they are analyzed, and where appropriate they are processed.

More specifically, during the monitoring step E20, the module 2B acts via a closed-loop making use of the corrector networks R1, R2, and R3 with suitable parameters and interconnected with one another to maintain the current values of the rate of acceleration dN2/dt and of the temperature EGT within determined ranges of values (also referred to in the present description as the "control corridor").

These values are maintained by using correction signals delivered by the corrector networks R1, R2, and R3, which signals are used by the monitoring module 2B to adjust (i.e. to correct or to modulate) the command WL_OL as generated by the module 2A (step E30).

It should be observed that the command WL_OL is not adjusted all the time (which is why this is drawn in dashed lines in FIG. 3): such adjustment is undertaken only when it is found to be necessary in order to maintain the rate of acceleration dN2/dt and the temperature EGT within the ranges of values that have been set in order to ensure operability of the turbojet 1.

In other words, the closed-loop put into place by the monitoring module 2B is not a full authority closed-loop: the main command for regulating the fuel meter is the command WF_OL delivered by the module 2A, which command is modulated in ancillary manner by the monitoring module 2B in order to maintain the values of the monitored operating parameters within the desired ranges of values.

In the presently-described embodiment, the ranges of values under consideration for the rate of acceleration (dN2/dt) and for the temperature EGT are defined as described below.

The range of values under consideration for the rate of acceleration is defined by a minimum setpoint value THR1 that is set (e.g. by the service in charge of the operability of the turbojet 1) so as to avoid the turbojet 1 stagnating (i.e. the setpoint THR1 represents a value for the rate of acceleration below which the turbojet 1 is considered to be abnormally stagnant), and by a maximum setpoint value THR2 that represents a value for the rate of acceleration above which it is considered that the turbojet 1 is accelerating too fast and runs the risk of the turbojet surging.

It should be observed that the surging limit of the turbojet is difficult to transpose into a maximum setpoint value for the rate of acceleration, such that in the presently-described implementation, this maximum setpoint value THR2 is determined by training. For this purpose, a surging detector is used that stores each surging event of the turbojet 1 together with the conditions under which such surging takes place, and for each event that is detected in this way it updates the threshold value THR2 as a function of the corresponding conditions. Such a mechanism for determining the threshold value THR2 is described in greater detail in as yet unpublished French patent application No. 11/51778.

The range of values under consideration for the temperature EGT is defined by an upper limit only, i.e. by a maximum temperature setpoint value THR3. This setpoint value is determined for example by the service in charge of the operability of the turbojet 1 so as to limit any risk of forced interruption of the turbojet 1 as a result of a temperature that is too high.

As described above, in the presently-described embodiment, the command WF_OL is adjusted by the monitoring module 2B on the basis of correction signals delivered by the corrector networks R1, R2, and R3, which networks are of the proportional integral (PI) type or of the proportional double integral (PI-I) type (referred to more generally in the present description as corrector networks of the proportional integral type).

More specifically, the corrector network R1 in this example is for correcting the command WF_OL for fuel flow rate in such a manner as to maintain the current value of the rate of acceleration of the high-pressure compressor above the minimum setpoint value THR1, below which there is a risk of the turbojet 1 stagnating.

To this end, the corrector network R1 is suitable for delivering a correction signal referenced SIG1 that is to be added to the command WL_OL.

In the present example, the corrector network R1 is a proportional double integral network (or PI-I integrator) having the transfer function $C1(p)$, where p is the Laplace variable, as follows:

$$C1(p) = \frac{K1(1 + \tau 1 \cdot p)}{p^2} = \frac{C1'(p)}{p}$$

where K1 and τ1 are respective parameters of the corrector network R1. These parameters K1 and τ1 of the corrector network R1 depend on the state of the turbojet 1; more particularly, in this example, the gain K1 depends on the static pressure PS32 in the combustion chamber of the turbojet and on the total pressure Pt at the inlet to the fan of the turbine engine, whereas the parameter τ1 is set as a function of the inertia of the turbojet 1 in response to a flow rate of fuel injected into the combustion chamber. The current values for the pressures PS32 and Pt are delivered to the corrector network R1 by the sensors 9.

The correction signal SIG1 is obtained by applying the transfer signal $C1(p)$ to an error signal, written δ1, between the minimum setpoint value THR1 and the current value of dN2/dt, in other words:

δ1=THR1−(dN2/dt)

Naturally, other parameters may be taken into account for setting K1 and τ1.

Thus, the corrector network R1 causes an error signal 61 between the current value of the rate of acceleration and its minimum setpoint THR1, to correspond to a fuel flow rate increment SIG1 for causing this error δ1 to disappear, in other words for enabling the rate of acceleration of the high-pressure compressor of the turbojet 1 to return to a "normal" value (i.e. within the limits of the control corridor that has been set for the turbojet).

In similar manner, the corrector network R2 in this example is for correcting the fuel flow rate command WF_OL so as to maintain the current value of the rate of acceleration of the high-pressure compressor below the maximum setpoint value THR2, above which there exists a risk of the turbojet 1 surging.

For this purpose, the corrector network R2 is suitable for delivering a correction signal written SIG2 for adding to the command WL_OL.

In the presently-described example, the corrector network R2 is also a proportional double integral (PI-I) network having its transfer function $C2(p)$ given by:

$$C2(p) = \frac{K2(1 + \tau 2 \cdot p)}{p^2} = \frac{C2'(p)}{p}$$

where K2 and τ2 are respective parameters of the corrector network R2. These parameters K2 and τ2 of the corrector network R2 depend on the state of the turbojet 1; more particularly in this example, the gain K2 depends on the static pressure PS32 and on the total pressure Pt at the inlet to the fan of the turbine engine, while τ2 is set as a function of the inertia of the turbojet 1 in response to a flow rate of fuel injected into its combustion chamber.

The correction signal SIG2 is obtained by applying the transfer function $C2(p)$ to an error signal written δ2 between the maximum setpoint value THR2 and the current value of dN2/dt, in other words:

δ2=THR2−(dN2/dt)

Naturally, other parameters could be taken into account for setting K2 and τ2.

Thus, the corrector network R2 causes an error signal δ2 between a current value of the rate of acceleration and its maximum setpoint THR2 to correspond to a fuel flow rate increment SIG2 for causing the error δ2 to disappear, in other words for enabling the rate of acceleration of the high-pressure compressor of the turbojet 1 to return to a "normal" value (i.e. a value within the limits of the control corridor that has been set for the turbojet).

Finally, the corrector network R3 in this example is for correcting the fuel flow rate command WF_OL so as to maintain the current value of the temperature EGT below the maximum temperature setpoint value THR3, above which there exists a non-negligible risk of it being necessary to interrupt starting of the turbojet 1.

For this purpose, the corrector network R3 is suitable for delivering a correction signal written SIG3 that is to be added to the command WL_OL.

In the presently-described example, the corrector network R3 is likewise a proportional integral network (PI), having a transfer function $C3(p)$ that is given by:

$$C3(p) = \frac{K3(1 + \tau 3 \cdot p)}{p} = \frac{C3'(p)}{p}$$

where K3 and τ3 designate respective parameters of the corrector network R3. These parameters K3 and τ3 of the corrector network R3 depend on the state of the turbojet 1; more particularly in this example, the gain K3 depends on the static pressure PS32 and on the total pressure Pt at the inlet to the fan of the turbine engine, while τ3 is set as a function of the inertia of the turbojet 1 in response to a fuel flow rate injected into its combustion chamber.

The correction signal SIG3 is obtained by applying the transfer function C3(p) to an error signal written δ3 between the maximum setpoint value THR3 and the current value EGT, in other words:

$$\Delta 3 = THR3 - EGT$$

Naturally, other parameters may be taken into account for setting K3 and τ3.

Thus, the corrector network R3 causes an error signal δ3 between the current value of the temperature EGT and its maximum setpoint THR3 to correspond to a fuel flow rate increment SIG3 that is to cause the error δ3 to disappear, in other words that is to enable the temperature EGT of the turbojet 1 to be maintained at a value that is "normal" (i.e. within the limits of the control corridor that has been set for that value).

In the presently-described implementation, the monitor module 2B establishes a hierarchy between the correction signals SIG1, SIG2, and SIG3 delivered by the corrector networks R1, R2, and R3. In other words, at any given instant, it selects the correction signal from among the correction signals SIG1, SIG2, and SIG3 that is to be used for adjusting the command WF_OL.

In this example, this selection is performed by a chain of functions of the min/max type (i.e. minimum or maximum types), which functions are applied to the output of the corrector networks in pairs. An example of such functions is described in greater detail below with reference to FIG. 4.

These functions serve to give precedence to one correction signal relative to another in order to adjust the command WF_OL. Preferably, precedence is given to the monitored operating parameters that comply with high setpoints, i.e. that comply with the setpoints THR2 and THR3. In other words, this means that if both a correction signal SIG1 is delivered by the corrector network R1 and a correction signal SIG3 is delivered by the corrector network R3, then precedence is given to selecting the correction signal SIG3 for adjusting the command WF_OL.

The fuel flow rate command that results from the adjustment step E30 is written WFCmd whether or not there is any adjustment (WFCmd=WF_OL if no adjustment is needed).

In the presently-described implementation, the generator device 2 performs a step of saturating the command WFCmd prior to delivering it to the fuel meter. This saturation depends on the command WF_OL established by the module 2A, and it is established by applying respective gains Gmin and Gmax to the command WF_OL (step E40).

This saturation seeks to ensure that the command WFCmd does indeed lie between two limit values derived from the command WF_OL (these limit values corresponding for example to a percentage of the command WF_OL as defined by the gains Gmin and Gmax).

For this purpose, the command WFCmd is saturated where appropriate to Gmin×WF_OL or to Gmax×WF_OL as a function of its current value, i.e. if the command WFCmd is less than Gmin×WF_OL, its value is forced to Gmin×WF_OL; on the contrary, if the command WFCmd is greater than Gmax×WF_OL, then its value is forced to the value Gmax×WF_OL.

This serves to ensure in particular that no command having an aberrant (or "outlier") value is transmitted to the fuel meter (which might happen for example if the turbojet 1 has failed), or quite simply to confine the command that is transmitted to the fuel meter to within a determined range of values, e.g. corresponding to the fuel injection limits specified by the fuel meter.

Where applicable, the saturated command WFCmd is then delivered to the fuel meter (step E50).

Figure 4:
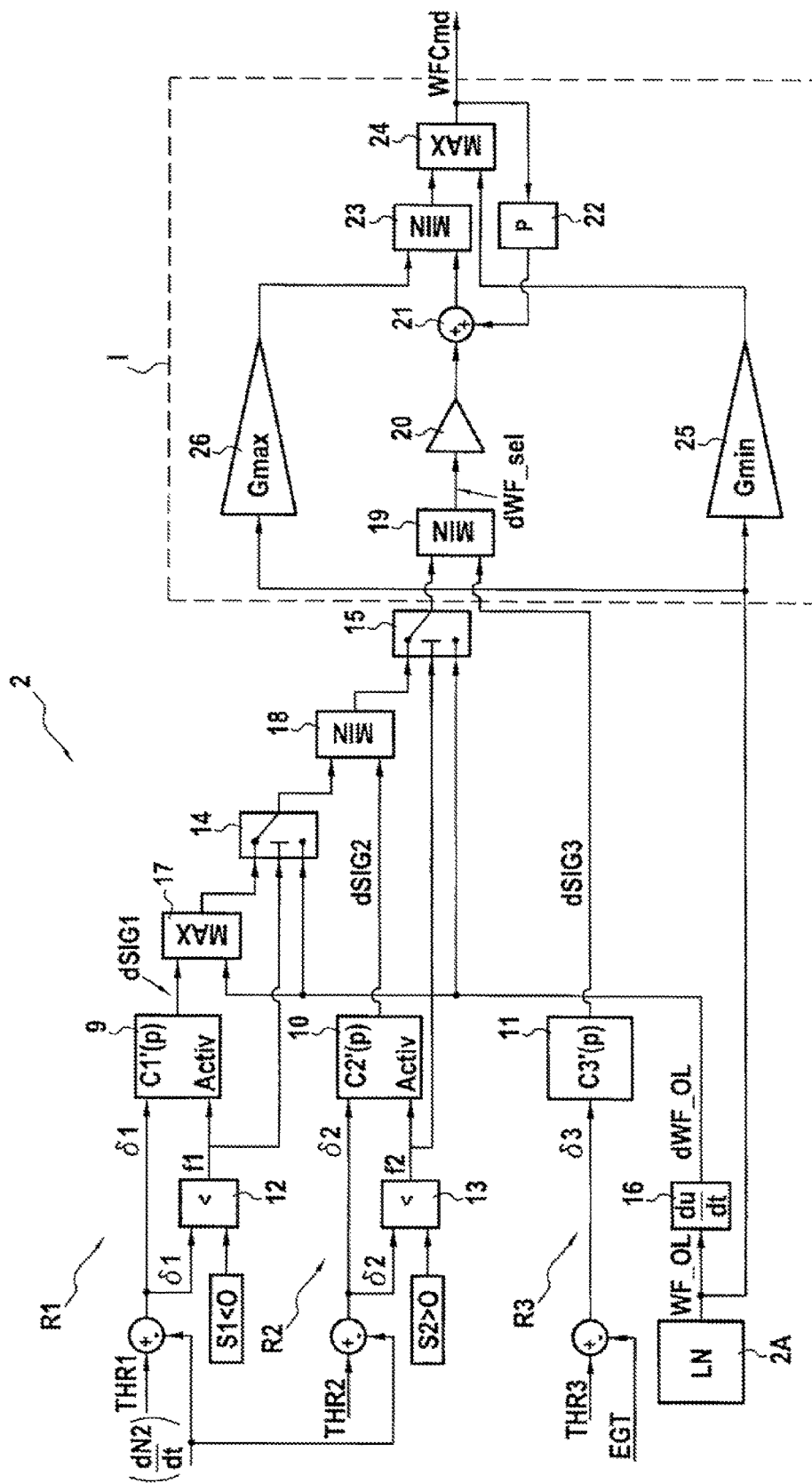
FIG. 4 shows control architecture that can be used by the FIG. 1 generator device for implementing the steps shown in FIG. 3.

There follows a more detailed description given with reference to FIG. 4 of the control architecture implemented in the presently-described embodiment by the monitoring module 2B for maintaining the current values of the rate of acceleration (dN2/dt) and of the temperature EGT in the above-mentioned value ranges.

This control architecture serves to perform steps E20, E30, and E40 as described above, which consist in monitoring the operating parameters of the turbojet 1, in adjusting the command WF_OL as generated in an open-loop by the module 2A, and in saturating the command WFCmd as delivered to the fuel meter, where necessary.

In this architecture, the three corrector networks R1, R2, and R3 that are used by the module 2B for determining the appropriate correction, if any, that needs to be applied to the command WF_OL all share a common integrator I that is saturated as a function of the current value of the command WF_OL.

This is possible given the transfer functions C1, C2, C3 defining the networks, which functions can be written in the form of a product of a first transfer function C1', C2', C3' implemented by a respective module 9, 10, or 11 as multiplied by a 1/p integration second function that is performed by the saturated integrator I.

The use of a common saturated integrator advantageously makes it possible to limit discontinuities in the flow rate setpoints delivered by the corrector networks R1, R2, and R3, and makes it easy to saturate commands coming from the closed-loop (cf. step E40).

Figure 5A:
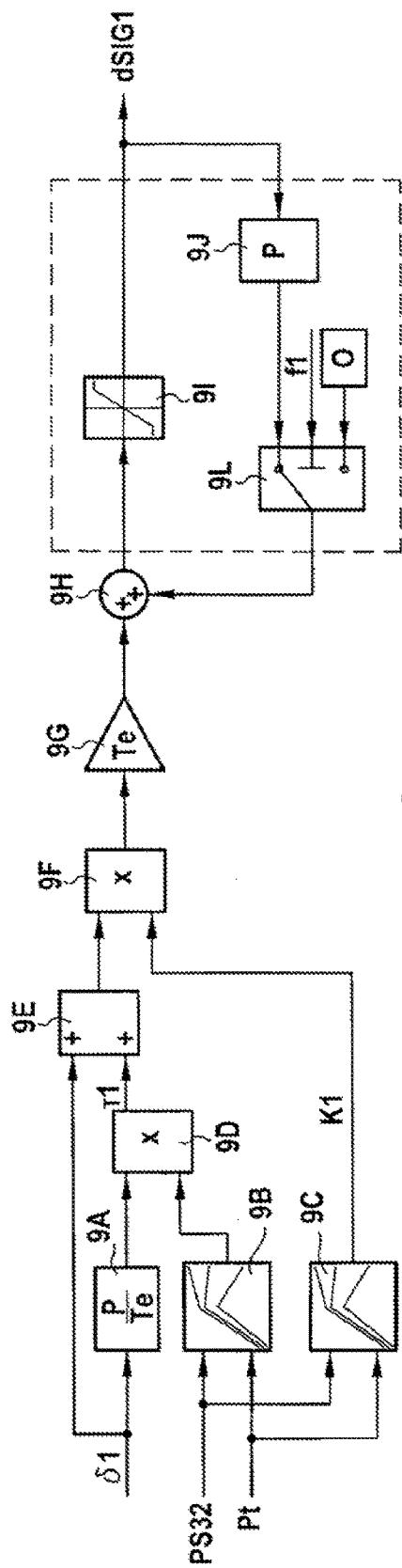
FIGS. 5A and 5B represent examples of corrector networks that can be used in the generator device.

The modules 9 and 10 that implement the transfer functions C1 and C2 respectively also include respective second integrators as shown in FIG. 5A (integrator element 9J) as described in greater detail below. The second integrator may suffer from problems known as "wind-up" or as "drift" (or indeed runaway), that are well known to the person skilled in the art.

In order to manage these problems, the architecture shown in FIG. 4 proposes activating the second integrator only when the current value of the rate of acceleration dN2/dt is close to its setpoint, in other words close to the value THR1 for the module 9 or the value THR2 for the module 10. This activation or deactivation of the integrators of the modules 9 and 10 is managed respectively by modules 12 and 13.

More precisely:
The module 12 compares the estimated difference δ1 between the setpoint THR1 and the current value of (dN2/dt) relative to a chosen negative threshold S1. If δ1<S1, then the module 12 positions a Boolean flag f1 to a value 1 (or TRUE), suitable for activating the integrator 9J of the module 9. Otherwise, the Boolean flag f1 is set to a value 0 (or FALSE) and does not activate the integrator 9J of the module 9.
In similar manner, the module 13 compares the estimated difference δ2 between the setpoint value THR2 and the current value of (dN2/dt) relative to a setpoint S2 that is chosen to be positive. If δ2<S2, then the module 12 sets a Boolean flag f2 to a value 1 (or TRUE), suitable for activating the integrator of the module 10. Otherwise, the Boolean flag f2 is set to a value (or FALSE) and the integrator of the module 10 is kept inactive.

The thresholds S1 and S2 are chosen empirically, and to be sufficiently small to avoid the above-mentioned wind-up problems.

The fact that it is possible for the integrators of the modules 9 and 10 to be deactivated under certain conditions also serves to ensure that the values output by the modules 9 and 10 cannot be selected by the generator device 2 while such deactivation is in effect. This is ensured in the architecture shown in FIG. 4 by providing two selector modules (or switches) 14 and 15 that are controlled respectively by the output from the modules 12 and 13.

Thus, the selector module 14 selects the output from the module 9 only if $\delta 1 < S1$ (in other words if the integrator 9J of the module 9 is activated). Likewise, the selector module 15 selects the output from the module 10 only if $\delta 2 < S2$ (in other words if the integrator of the module 10 is activated).

If $\delta 1 \geq S1$ or if $\delta 2 \geq S2$, then the selector modules 14 and 15 select a value obtained by time differentiating the command WF_OL as evaluated by the module 2A. This time differentiation is performed by a conventional differentiation module 16.

It should be observed that because a saturated integrator I is used in common for the three corrector networks R1, R2, and R3, the values output by the modules 9, 10, and 11 correspond respectively to the time derivatives of the correction signals SIG1, SIG2, and SIG3, which are written respectively dSIG1, dSIG2, and dSIG3 (which also explains why the command WF_OL is differentiated by the differentiation module 16 so as to make this command comparable to the values that are manipulated by the selector modules 14 and 15).

The selection of one or another of the values dSIG1, dSGI2, dSIG3, and dWF_OL is performed by various MIN/MAX modules 17, 18, and 19. More precisely:
  the module 17 is configured to select the greater of the values from the values dSIG1 and dWF_OL that are delivered to its inputs (in other words, the module 17 is responsible for activating or not activating the adjustment of the command WF_OL)
  the module 18 is configured to select the smaller of the values from the value dSIG2 and the value at the output from the selector module 14, which values are delivered to it as inputs; and
  the module 19 is configured to select the smaller of the values dSIG3 and the output from the selector module 15, which values are delivered to it as inputs.

The value available at the output from the module 19 is written dWF_sel.

This value dWF_sel is then processed by the integrator I.

In known manner, the integrator I comprises an amplifier 20 (of gain that is the reciprocal of the sampling period), a summing module 21, and an integration module 22.

In the presently-described embodiment, it also includes two modules 23 and 24 that guarantee that the setpoint value WFCmd as delivered by the fuel meter generator device 2 is saturated, i.e. does indeed lie between two limit values obtained respectively by applying a gain Gmin (via the amplifier 25) and a gain Gmax (via the amplifier 26) to the setpoint value WF_OL delivered by the module 2A.

In compliance with this architecture, the setpoint value WFCmd is sometimes equal to the value WF_OL delivered by the module 2A performing open-loop regulation, and sometimes equal to the value WF_OL as corrected using a correction signal SIG1, SIG2, or SIG3, ignoring the saturation that is performed by the modules 23 and 24.

Figure 5B:
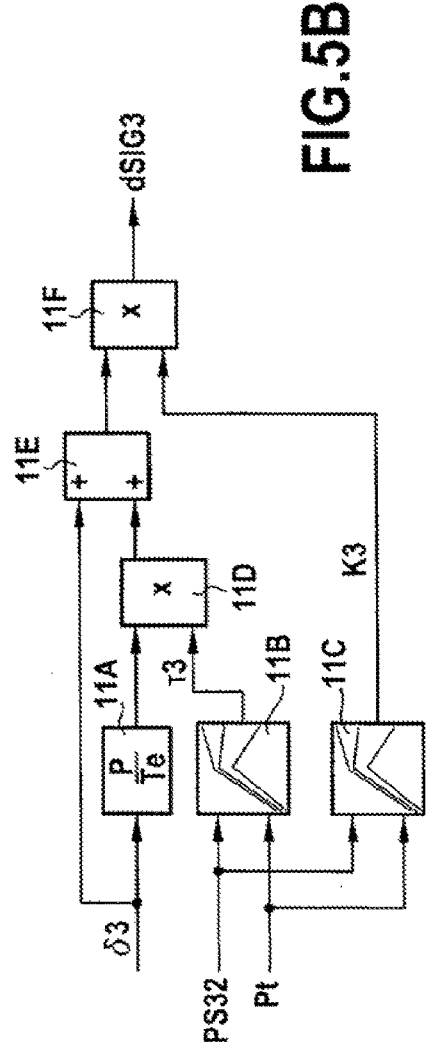

FIGS. 5A and 5B show digital architecture examples that can be used for the modules 9 and 11. An architecture similar to that shown in FIG. 5A can be envisaged for the module 10.

With reference to FIG. 5A, the module 9 for implementing the transfer function C1'(p) comprises in conventional manner:
  a discrete differentiator element 9A working at the sampling period Te and receiving the difference $\delta 1$ as input;
  an element 9B for using predefined charts to select a value for the parameter T1 as a function of current values of the pressure PS32 and of the total pressure Pt;
  an element 9C for using predefined charts to select a gain value K1 as a function of the current values of the pressure PS32 and of the pressure Pt;
  a multiplier element 9D suitable for multiplying the output from the differentiator element 9A by the parameter T1 from the element 9B;
  a summing element 9E suitable for summing the output from the element 9D and the difference $\delta 1$;
  a multiplier element 9F suitable for multiplying the gain K1 from the element 9C by the output from the element 9E;
  an amplifier element 9G suitable for multiplying the output from the element 9F by the sampling period Te;
  a summing element 9H; and
  a saturated integrator 91 comprising an integrator module 9J, a saturation element 9K, and a selector module 9L controlled by the flag f1: more precisely, if the flag f1 is set to a value 1, then the selector module 9L selects the output from the integrator module 9J; in contrast, if the flag f1 is set to a value 0, then the selector module 9L selects the value zero.

With reference to FIG. 5B, the module 11 for implementing the transfer function C3'(p) comprises, in conventional manner:
  a discrete differentiator element 11A working at the sampling period Te and receiving the difference $\delta 3$ as input;
  an element 11B for using predefined charts to select a value for the parameter $\tau 3$ as a function of a current value of the pressure PS32 and of the total pressure Pt;
  an element 11C for using predefined charts to select a value for the gain K3 as a function of the current value of the pressure PS32 and of the pressure Pt;
  a multiplier element 11D suitable for multiplying the output from the differentiator element 11A by the parameter $\tau 3$ from the element 11B;
  a summing element 11E suitable for summing the output from the element 11D and the difference $\delta 3$; and
  a multiplier element 11F suitable for multiplying the gain K3 from the element 11C by the output from the element 11E.

The invention claimed is:

1. A method of generating a fuel meter command for a fuel meter to control a fuel flow rate to be injected into a combustion chamber of a turbine engine for propelling an aircraft, comprising:
  during a stage of starting the turbine engine:
  open-loop generating of an open-loop fuel flow rate command from a pre-established relationship; and
  concurrently with the open-loop generating, closed-loop monitoring of at least one operating parameter of the turbine engine selected from:
    a rate of acceleration of a compressor of the turbine engine; and a temperature at an outlet from a turbine of the turbine engine;
the closed-loop monitoring comprising:
generating, using at least one corrector network associated with the at least one operating parameter, a respective correction signal for correcting the open-loop fuel flow rate command; and
selectively correcting the open-loop fuel flow rate command to obtain a corrected open-loop fuel flow rate command using the respective correction signal of one of the at least one corrector network when correction is required in order to maintain the at least one operating parameter in a respective determined range of values,
wherein the at least one corrector network has a respective gain value that depends on a static pressure in the combustion chamber and on a total pressure at an inlet of a fan of the turbine engine; and
wherein the fuel meter command is generated as the open-loop fuel flow rate command when the open-loop fuel flow rate command is not corrected during the closed-loop monitoring and the fuel meter command is generated as the corrected open-loop fuel flow rate command when the open-loop fuel flow rate command is corrected using the respective correction signal during the closed-loop monitoring.

2. The method according to claim 1, wherein, during the closed-loop monitoring, the rate of acceleration of the compressor of the turbine engine is maintained in the respective determined range of values between a minimum acceleration setpoint value and a maximum acceleration setpoint value.

3. The method according to claim 1, wherein, during the closed-loop monitoring, the temperature at the outlet from the turbine of the turbine engine is maintained in the respective determined range of values below a maximum temperature setpoint value.

4. The method according to claim 1, wherein the at least one corrector network generating the respective correction signal comprises:
a first corrector network generating a respective first correction signal associated with the rate of acceleration of the compressor, and
a second corrector network generating a respective second correction signal associated with the temperature at the outlet from the turbine;
wherein the closed-loop monitoring further includes selecting one of the first correction signal or the second correction signal, the selected correction signal being used for the selective correcting of the open-loop fuel flow rate command.

5. The method according to claim 4, wherein the selected correction signal is the second correction signal generated by the second corrector network associated with the temperature at the outlet from the turbine.

6. The method according to claim 4, wherein each of the first corrector network and the second corrector network is of the proportional integral or proportional double integral type, and wherein the first correction signal or the second correction signal is evaluated from a difference between a current value of the at least one operating parameter with which it is associated and a respective determined setpoint value.

7. The method according to claim 1, further including saturating the fuel meter command after the selective correcting.

8. The method according to claim 7, wherein said saturating comprises forcing the fuel meter command to take one or the other of a first limit value and a second limit value corresponding respectively to a minimum percentage and to a maximum percentage of the open-loop fuel flow rate command that is not yet selectively corrected, if the current value of the fuel meter command is respectively less than the first limit value or greater than the second limit value.

9. The method of claim 1, wherein the turbine engine is an aircraft turbine engine.

10. The method of claim 1, wherein the turbine engine is a two-spool turbine engine.

11. The method of claim 10, wherein the compressor is a high-pressure compressor of the two-spool turbine engine.

12. A device for generating a fuel meter command for a fuel meter to control a fuel flow rate to be injected into a combustion chamber of a turbine engine for propelling an aircraft, comprising:
a processor; and
a non-transitory computer readable medium storing instructions that, when executed by the processor, configure the processor, during a state of starting the turbine engine, to:
open-loop generate an open-loop fuel flow rate command from a pre-established relationship; and
concurrently with the open-loop generation, closed-loop monitor at least one operating parameter of the turbine engine selected from:
rate of acceleration of a compressor of the turbine engine; and
temperature at an outlet from a turbine of the turbine engine;
wherein to monitor the at least one operating parameter, the processor is configured to:
generate, using at least one corrector network associated with the at least one operating parameter, a respective correction signal for correcting the open-loop fuel flow rate command, and
selectively correct the open-loop fuel flow rate command to obtain a corrected open-loop fuel flow rate command using the respective correction signal of one of the at least one corrector network when correction is required in order to maintain the at least one operating parameter in a determined range of values,
wherein the at least one corrector network has a gain value that depends on a static pressure in the combustion chamber and on a total pressure at an inlet of a fan of the turbine engine, and
wherein the fuel meter command is generated as the open-loop fuel flow rate command when the open-loop fuel flow rate command is not corrected during the closed-loop monitoring and the fuel meter command is generated as the corrected open-loop fuel flow rate command when the open-loop fuel flow rate command is corrected using the respective correction signal during the closed-loop monitoring.

13. The device according to claim 12, wherein the at least one corrector network comprises a plurality of corrector networks sharing a common integrator.

14. The device according to claim 13, wherein the common integrator is saturated.

15. The device according to claim 12, wherein the at least one corrector network generating the respective correction signal comprises a plurality of corrector networks generating respective correction signals, the processor configured to select the respective corrective signal delivered by one of the plurality of corrector networks to correct the open-loop fuel flow rate command.

16. A turbine engine including a device according to claim 12.

17. A method of generating a fuel meter command for a fuel meter to control a fuel flow rate to be injected into a combustion chamber of an aircraft turbine engine for propelling an aircraft, comprising:

during a stage of starting the aircraft turbine engine:

open-loop generating of an open-loop fuel flow rate command from a pre-established relationship; and concurrently with the open-loop generating, closed-loop monitoring of at least one operating parameter of the aircraft, turbine engine selected from:

a rate of acceleration of a compressor of the aircraft turbine engine; and a temperature at an outlet from a turbine of the aircraft turbine engine;

the closed-loop monitoring comprising:

generating, using at least one corrector network associated with the at least one operating parameter, a respective correction signal for correcting the open-loop fuel flow rate command; and selectively correcting, the open-loop fuel flow rate command to obtain a corrected open-loop fuel flow rate command using the respective correction signal of one of the at least one corrector network when required in order to maintain the at least one operating parameter in respective determined range of values;

wherein the at least one corrector network has a respective gain value that depends on a static pressure in the combustion chamber and on a total pressure at an inlet of a fan of the turbine engine; and wherein the fuel meter command is generated as the open-loop fuel flow rate command when the open-loop fuel flow rate command is not corrected during the closed-loop monitoring and the fuel meter command is generated as the corrected open-loop fuel flow rate command when the open-loop fuel flow rate command is corrected using the respective correction signal during the closed-loop monitoring.

18. The method of claim 17, wherein the turbine engine is a two-spool turbine engine and the compressor is a high-pressure compressor of the two-spool turbine engine.

* * * * *